United States Patent [19]

Turner

[11] Patent Number: 4,951,838

[45] Date of Patent: Aug. 28, 1990

[54] FEEDING DISCRETE OBJECTS

[75] Inventor: William J. Turner, Middlesex, England

[73] Assignee: Anstalt Gersan, Vaduz, Liechtenstein

[21] Appl. No.: 817,869

[22] Filed: Jan. 13, 1986

[30] Foreign Application Priority Data

Jan. 18, 1985 [GB] United Kingdom ............. 8501335

[51] Int. Cl.$^5$ .......................................... B23Q 7/04
[52] U.S. Cl. ............................... 221/211; 198/471.1
[58] Field of Search ............... 221/211, 278; 198/392, 198/443, 471.1, 803.16, 803.5; 414/223, 225; 406/52; 111/77, 34, 6-7

[56] References Cited

U.S. PATENT DOCUMENTS

| | | | |
|---|---|---|---|
| 2,593,516 | 4/1952 | Alley et al. | 111/34 X |
| 3,058,588 | 10/1962 | Palmquist | 209/74 |
| 3,425,736 | 2/1969 | Benjamin | 294/64 |
| 3,511,016 | 5/1970 | Craig | 221/211 X |
| 3,698,332 | 10/1972 | McCallum | 221/211 X |
| 3,707,244 | 12/1972 | Hull et al. | 221/211 X |
| 3,820,666 | 6/1974 | Nye et al. | 221/211 X |
| 3,843,018 | 10/1974 | Holmes et al. | 221/211 |
| 4,241,849 | 12/1980 | Harrer | 221/278 X |
| 4,278,183 | 7/1981 | Billington | 221/211 |
| 4,316,628 | 2/1982 | Farmer et al. | 294/64 R |

FOREIGN PATENT DOCUMENTS

| | | |
|---|---|---|
| 3101864 | 8/1982 | Fed. Rep. of Germany . |
| 2249521 | 5/1975 | France ............ 221/211 |
| 8701974 | 4/1987 | PCT Int'l Appl. . |
| 582264 | 9/1958 | South Africa . |
| 735915 | 8/1973 | South Africa . |
| 1113016 | 9/1984 | U.S.S.R. ............ 111/77 |
| 936161 | 9/1963 | United Kingdom . |
| 1235076 | 6/1971 | United Kingdom . |
| 1274267 | 5/1972 | United Kingdom . |
| 1305565 | 2/1973 | United Kingdom . |
| 1315810 | 5/1973 | United Kingdom . |
| 1382479 | 2/1975 | United Kingdom . |
| 1560446 | 2/1980 | United Kingdom . |

OTHER PUBLICATIONS

Abstract of South Africa 81/0203 (Heironymus), 12-1981.

Primary Examiner—Charles A. Marmor
Attorney, Agent, or Firm—Kerkam, Stowell, Kondracki & Clarke

[57] ABSTRACT

A feeder has a rotary bowl with a highly resilient foam plastic insert providing a V-shaped annular trough to which objects are fed, a rotary feeder head whose axis is inclined to the axis of the bowl, and a nozzle wheel carried by the feeder head with a number of suction nozzles arranged so that the nozzles pick up successive objects from the bowl. As the nozzle wheel rotates, ports on the nozzle wheel register with stationary ports to which compressed air is supplied, and cause the suction to be released and a blast of compressed air to be blown through an annular array of discharge openings.

19 Claims, 7 Drawing Sheets

FEEDING DISCRETE OBJECTS

BACKGROUND OF THE INVENTION

The invention relates to an apparatus for, and a method of, feeding discrete objects one by one. This is a particular problem when the objects are of different shapes and sizes, as may occur for instance in the gemstone industry, and where the objects are small, for instance of a sieve (pass) size of 10 mm, 5 mm or less (a minimum sieve size possibly being 0.5 mm). Although it must be expected with all apparatus that an occasional double feed occurs, frequent double feeds are very disturbing and should be avoided. A further problem in dealing specifically with gemstones is that gemstones are very hard and cause considerable abrasion if they are jostled or slid over other surfaces, so that it is desirable to provide an apparatus that involves as little jostling or sliding movement of the gemstones as possible.

THE INVENTION

The invention provides apparatus for feeding discrete objects one by one, comprising: a container for containing a number of the objects, the container having a base formed of highly resilient material; a feeder member having at least one suction nozzle, the nozzle being arranged to pass down into the container, and to pick up an object from the base of the container by suction; and means for discharging the object from the nozzle when the object has been lifted from the container.

The highly resilient base in the apparatus can prevent any jamming of the suction nozzle against the base of the container, even with a rather over-sized object, and can prevent the objects being crunched against each other.

The invention also provides apparatus for feeding discrete objects one by one, comprising:

a feeder member carrying at least one suction nozzle, the nozzle being arranged to pass down and pick up an object due to the effect of suction, the nozzle having a suction duct leading to a suction opening;

suction connection means for applying suction to the nozzle suction duct; and means for breaking the nozzle suction at a discharge point and discharging the object from the nozzle, which suction breaking means comprise means for blowing a pressure fluid into the nozzle suction duct without physically closing the suction connection means. More specifically, the suction nozzle can be associated with a passage for connection to a pressure fluid supply and connected to the nozzle suction duct, and valve means can be provided for opening the pressure fluid connection when the nozzle reaches a discharge point, thereby causing the suction to be ineffective at the nozzle suction opening when the nozzle reaches the discharge point.

This apparatus avoids having to provide a valve closure in the suction ducting to the nozzles. This is of particular importance where abrasive material may be present, for instance fine diamond dust when the objects are diamonds; such abrasive material tends to be drawn into the suction nozzles. If there is a valve closure, there must be some sliding member and the abrasive material very quickly wears the sliding member and causes imperfect operation.

The invention further provides apparatus for feeding discrete objects one by one, comprising: a feeder member carrying at least one suction nozzle, the nozzle being arranged to pass down and pick up an object due to the effect of suction, the nozzle having a suction opening and annular discharge opening means around the suction opening; and valve means for connecting the annular discharge opening means to a compressed fluid supply when the nozzle reaches the discharge point, thereby blowing the object off the suction opening.

This apparatus enables the object to be discharged from the nozzle in a roughly predictable direction, which is very useful in that the apparatus receiving the object does not have to have any particular arrangement for catching the object.

PREFERRED EMBODIMENTS

The invention will be further described, by way of example, with reference to the accompanying drawings, in which.

FIGS. 1 TO 12

Figure 1:
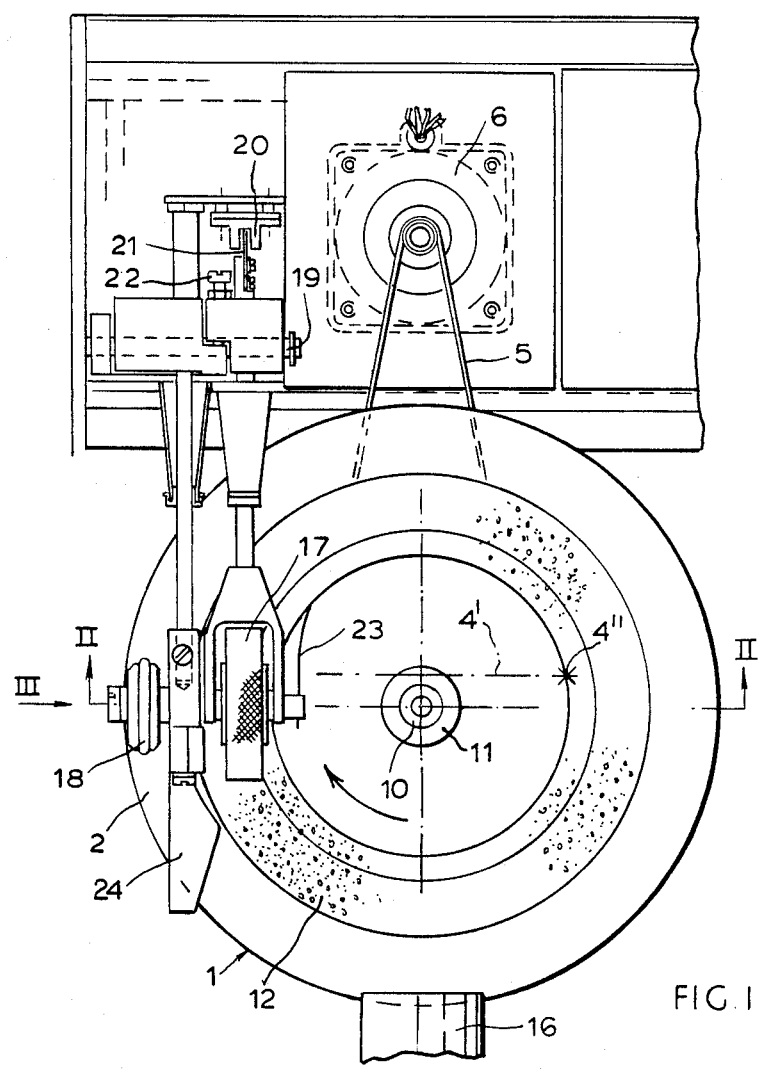
FIG. 1 is a plan of apparatus in accordance with the invention, the feeder member being omitted.

The apparatus is in two parts, namely a container part 1 having an open-top container in the form of a bowl 2, and a feeder part 3 having a feeder member in the form of a nozzle wheel 4.

The bowl 2 is rotatable about a vertical axis by means of a drive belt 5 and a motor 6. The drive connection includes a collar 7 which is biassed upwards by a spring 8. The bowl 2 can slide vertically with respect to a central spindle 9 and is retained by a central screw 10 (which determines the uppermost position of the bowl 2) and by an adjusting screw 11 (which adjusts the height of the bowl 2 against the spring 8). The height of the bowl 2 is adjusted to suit the size range of the objects. The pulley on the spindle 9 has a crowned ring and is made of a low-friction plastic such as polytetrafuoroethylene or Delrin so that the pulley slips at its inside diameter if a jam occurs.

The bowl 2 is of double-cone form, providing an annular V-shaped trough for the objects being fed. Suitable angles are chosen, for instance 30° inclination on the inner cone and 20° inclination on the outer cone. For higher speeds of rotation, steeper-sided bowls can be used. The bowl 2 can be made of metal or moulded in a plastics material such as melamine, but has its base formed by an annular insert 12 of highly resilient material such as a polyester foam having a density of 20-23 Kg/m$^3$ and a British Standard (BS 3667) hardness of 18-22 Kg. The trough base in the insert 12 is nearer the inner periphery than the outer periphery of the insert 12. The insert 12 prevents or makes very unlikely bridging or jamming between the nozzles 47 and the bowl 2, and can therefore avoid bending the nozzles 47 or damage to the objects or flipping the objects out of the bowl 2. The bowl 2 is surrounded by a close-fitting rim plate 13 located by the machine frame (not shown), and by decking 14. A feed channel 16 is provided for feeding in this case diamonds onto the periphery of the bowl 2.

In order to sense the presence of objects in the bowl 2, there is a sensor roller 17 associated with a bowl height datum roller 18, both mounted on arms pivoted on a common pivot 19. The sensor roller 17 may be made of foam. The datum roller 18 can have a small rubber tyre, as shown. The datum roller arm carries an opto-switch 20 associated with an interrupter 21 on the sensor roller arm. There is a sensor roller height adjusting screw 22 so that, if desired, the sensor roller 17 can be held clear of the insert 12 when the bowl 2 is empty. If the sensor roller 17 moves up too far in relation to the datum roller 18, a signal is given by the opto-switch 20, indicating that the bowl is over-full. Likewise, if the sensor roller 17 is too low in relation to the datum roller 18, the opto-switch 20 gives a signal indicating that more objects should be fed to the bowl 2. The interrupter 21 can provide simple on/off switching. The opto-switch 20 is connected to a primary feeder (not shown) such as a motorised hopper.

To ensure that the objects pass down into the base of the bowl 2 (on the insert 12), the sensor roller arm carries an inner scraper wire 23 and the datum roller arm carries an outer scraper blade 24.

Figure 2:
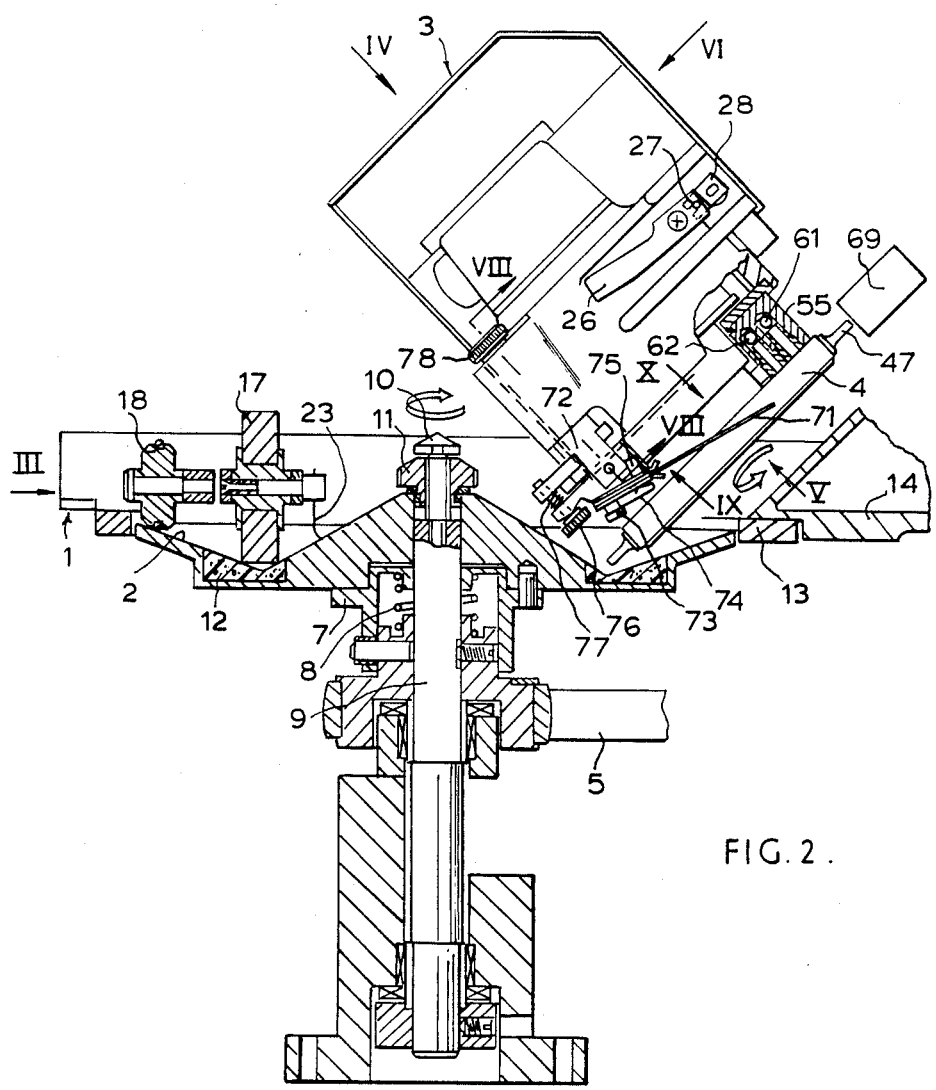
FIG. 2 is a side view of the apparatus, partly in section along the line II—II in FIG. 1.
Figure 3:
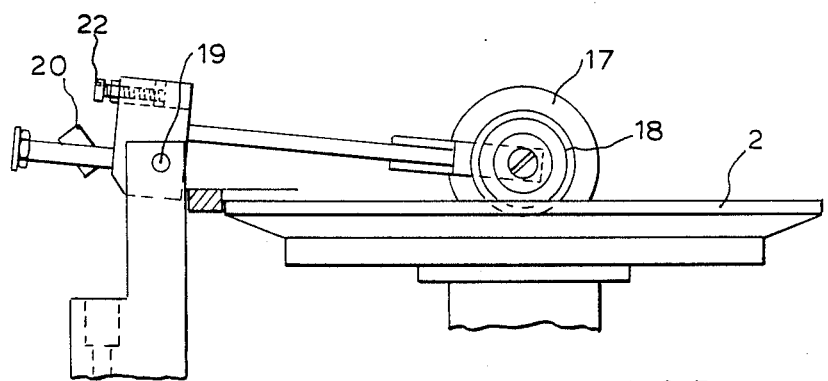
FIG. 3 is a side view looking in the direction of the arrow III in FIG. 2 (the feeder member being omitted)
Figure 6:
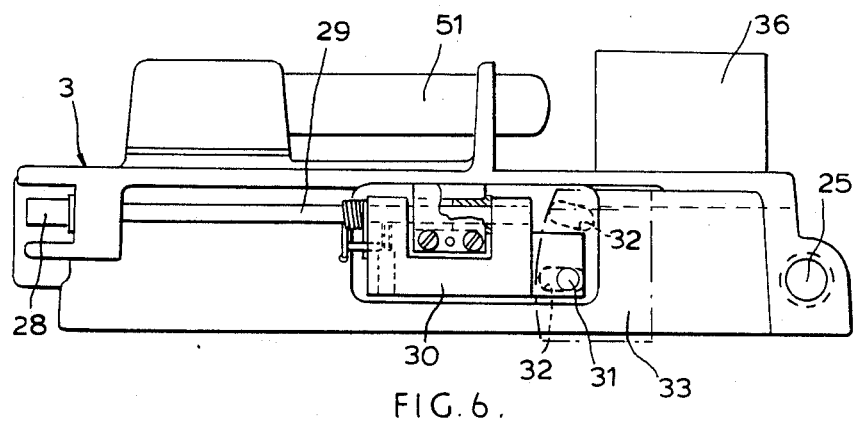
FIG. 6 is a view looking direct on the right-hand side of the feeder member, in the direction of the arrow VI in FIG. 2.
Figure 4:
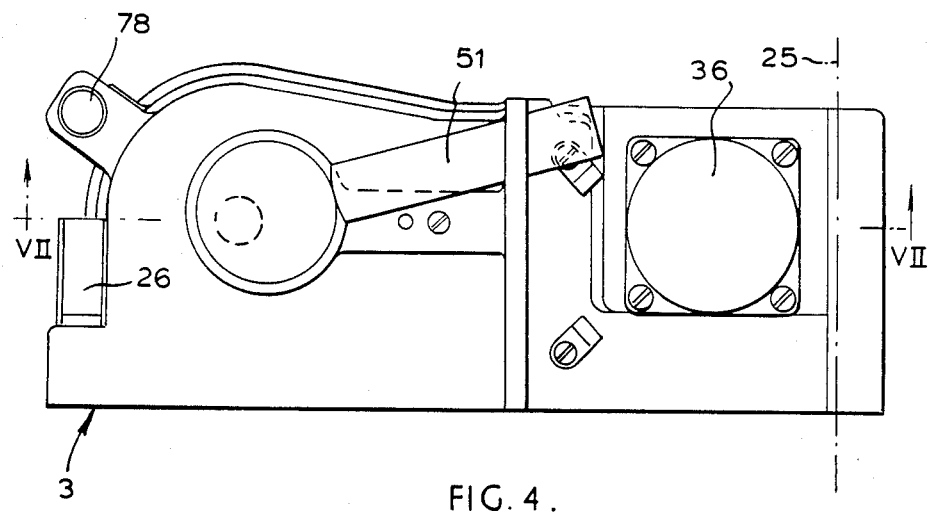
FIG. 4 is a view looking directly onto the top of the feeder member, in the direction of the arrow IV in FIG. 2.

The feeder part 3 is on a hinge mounting, and can be swung about an axis 25 which is behind the feeder part 3 as seen in FIG. 2 and inclined to the horizontal. The angle of the axis 25 determines the angle of the axis 4' of the nozzle wheel 4. A suitable angle can be chosen, but in the present case the axis 4' is inclined at 45° to the vertical. The axis 4' crosses the bowl axis without intersecting it with the lowest point 4" (see FIG. 1) on the path of the nozzles 47 being ahead (upstream) of the vertical diametrical plane of the bowl 2 to which the nozzle wheel axis 4' is parallel—this may reduce the risk of the nozzles 47 trapping objects against the base of the bowl 2, and increased clearance is provided on the rising side of the nozzle wheel 4, which is useful if a steep-sided (high speed) bowl is used—specifically the arrangement provides more clearance on the leading side, where the nozzles 47 are carrying the objects, than on the trailing side, where there are no objects on the nozzles. The distance between said diametrical plane and the nozzle wheel axis 4' is preferably about 10% of the operating diameter (the diameter of the bowl trough base). The feeder part 3 can be swung up to change nozzle wheels 4, on depressing a locking lever 26. The locking lever 26 has a pin 27 which engages forks (not visible in FIG. 2) on a head 28 of a locking rod 29. The rod 29 is spring-loaded in a rotational sense and carries a locking plate 30 (FIG. 6) which has a projecting locking pin 31. The pin 31 can engage in one of two slots 32 in a latch plate 33 secured to the machine frame.

Figure 7:
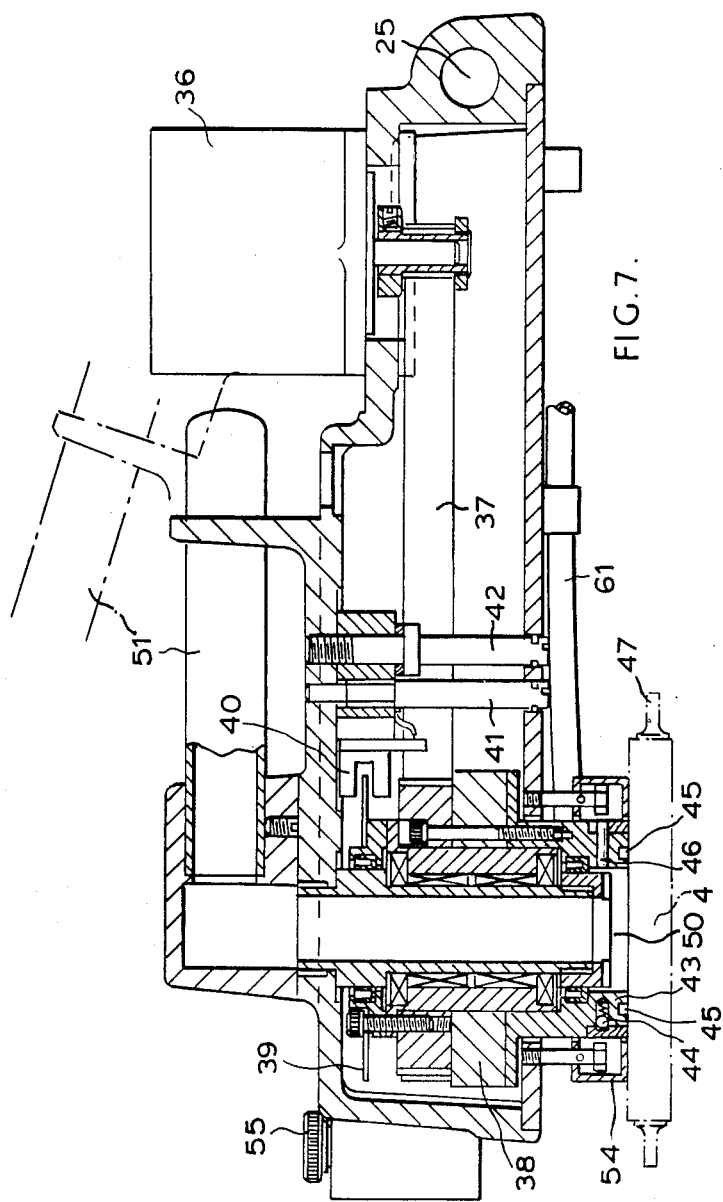
FIG. 7 is a section along the plane VII—VII in FIG. 4.

The feeder part 3 carries a stepper motor 36 connected by a drive belt 37 to the rotary feeder head 38. At one end (see FIG. 7), the feeder head 38 carries an encoder disc 39. There is an opto-switch 40 which is carried on a pivot shaft 41 and whose position can be locked by a locking screw 42. The opto-switch 40 reads slots in the encoder disc 39. At the other end, the feeder head 38 carries a mounting ring 43 with say three captive and sprung ball detents 44. These detents engage in an annular groove in a mating ring 45 on the nozzle wheel 4, thereby providing snap retention of the nozzle wheel 4. As shown in FIGS. 7 and 11, a radial locating pin 46 on the mounting ring 43 enters a short key-way on the ring 45 (visible in FIG. 10). The nozzle wheel 4 is readily, i.e. quickly and easily, exchangeable to suit the nozzle sizes to the sizes of the objects.

Figure 10:
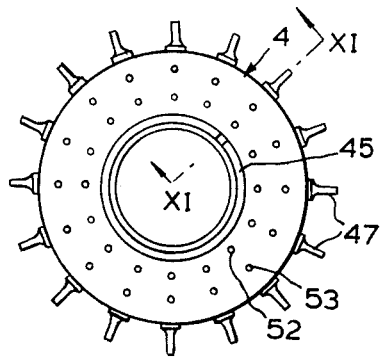
FIG. 10 is a view looking directly on the top of the nozzle wheel, in the direction of the arrow X in FIG. 2.
Figure 11:
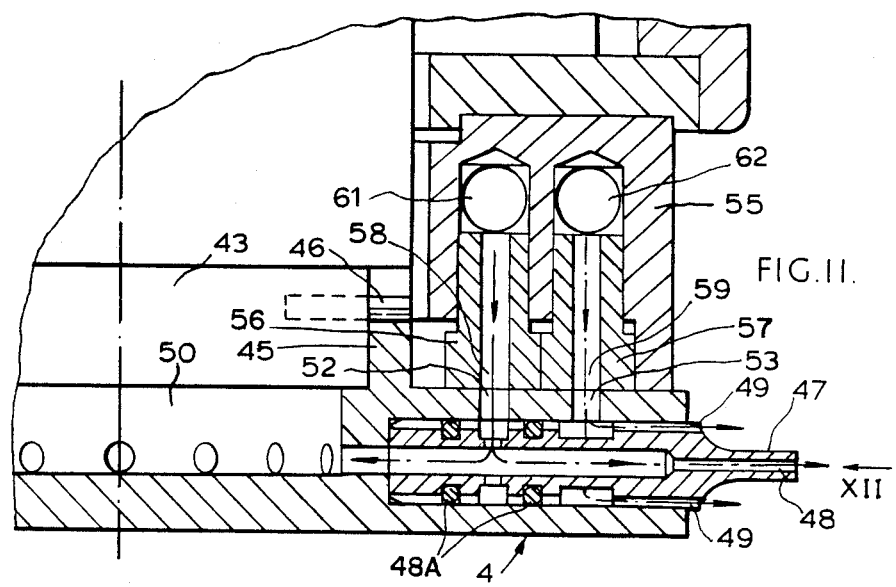
FIG. 11 is a section along the line XI—XI in FIG. 10, on a larger scale.
Figure 12:
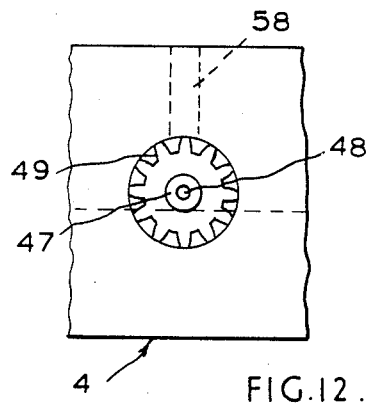
FIG. 12 is a view looking in the direction of the arrow XII in FIG. 11.

The nozzle wheel 4 is best seen in FIGS. 10 and 11. It carries a number of equally-spaced, removable suction nozzles 47 which are push-fitted in radial bores in the nozzle head 4, sealing being achieved by means of two coaxial but spaced O-rings. Each nozzle 47 has a central suction duct 48 leading to a suction opening at its tip. Each nozzle 47 has been machined from a cylindrical piece which had (radial) gear-type teeth cut around its periphery, as shown in FIG. 12, providing an annular array of discharge or eject means in the form of openings 49 around the suction opening 48. As shown in FIGS. 7 and 11, the suction duct 48 is connected to a central suction plenum 50. The plenum 50 extends up the middle of the feeder head 38 and is connected to a main suction lead 51. The suction duct 48 is also connected, by a branch adjacent the tip of the nozzle 47, to a suction release port 52. The eject openings 49 are connected to an eject port 53.

Figure 5:
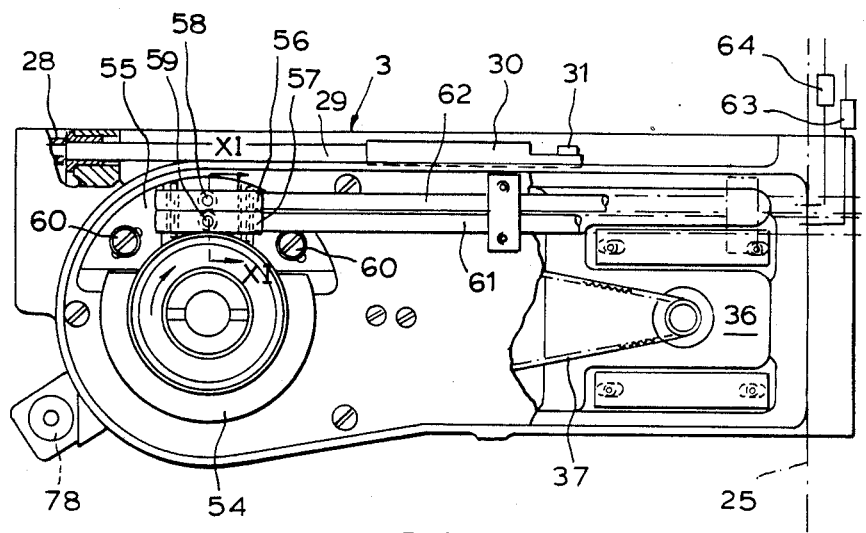
FIG. 5 is a view looking onto the bottom of the feeder member, in the direction of the arrow V in FIG. 2, the nozzle wheel being omitted.

As shown in FIGS. 5 and 7, the feeder part 3 carries a stationary part-annular (horseshoe) sealing member 54 which may be made for instance of polytetrafluoroethylene. This member engages the ports 52,53 and seals them, being freely suspended and held onto the top of the nozzle wheel 4 by suction—here wear by abrasive dust is not of critical importance. The feeder part 3 also carries a stationary shoe plate 55 which carries air transfer shoes 56,57 (see FIG. 11) having ports 58,59 which form valve means and will register with the ports 52,53. The individual shoes 56,57 can be made of for instance polytetrafluoroethylene, being held on by air pressure. The ports 52,53 are connected to individual compressed air lines 61,62 (see FIG. 5); the lines 61,62 are preferably not under constant pressure, being controlled by solenoid valves indicated schematically as 63,64, timed by the encoder disc 39, though it is considered that the eject solenoid 64 could be dispensed with, relying solely on the setting of the shoe plate 55 to set the eject timing.

As can be seen in FIG. 2, each nozzle 47 will in turn pass down into the bowl 2, will pick up an object in the bowl 2 by suction and will discharge the object into a further apparatus which is merely indicated in FIG. 2 as a schematic box 69. This further apparatus may for instance be an accelerator wheel or belt for the further conveyance of the object, as in GB2167029A, GB8526955. The object is discharged when the ports 52,53 in the nozzle wheel 4 register with the stationary ports 58,59. The release port 52 receives a pulse of air which destroys the suction at the suction opening, i.e.

causes the suction to be ineffective at the tip of the nozzle 47 (though the suction connection is not physically closed). The eject port 53 connects the eject openings 49 with the compressed air supply and causes a pulse of air to pass through them, blowing the objects positively off the suction opening. As the array of discharge openings 49 surrounds the suction opening, the force applied to the objects is fairly well balanced and will be in the axial direction of the nozzle 47. The array of eject openings 49 provides a broad and more accurate jet. By having a number of openings 49, rather than a single annular opening, more even flow is obtained around the nozzle 47, preventing a predisposition to blow the object off in a certain oblique direction. Thus fairly good control of the eject direction is achieved, and the object can be projected with reasonable accuracy into the further apparatus 65.

The timing of the pressure pulses can be adjusted by providing timing marks (not shown) on the nozzle wheel 4 and on the shoe plate 55, and adjusting the position of the nozzle wheel 4. The circumferential position of the shoe plate 55 can also be adjusted. In one example, where the nozzle wheel 4 rotates at 26.25 rpm (providing a feed of seven objects per second), the ports 52,53 and 58,59 can just start to overlap at 4° 48′ before the discharge axis, full registration occurring as or before the eject axis is reached. Though it is convenient to have the stationary ports 58,59 radially aligned, this is not essential. The air (suction) release is preferably initiated 4° 48′ before the eject axis and the eject timing is preferably set at 3° 48′ before the eject axis. The arrangement should be such that the ports 52,53 and 58,59 should be fully in register when the respective nozzle 47 is precisely coincident with the eject axis. The release timing procedure should be such that the release solenoid 63 is energised at a precise point in advance of the respective nozzle 47 being coincident with the eject axis, to allow for solenoid operation and air velocity build-up. The 4° 48′ angle allows 30 milleseconds at a feed rate of seven objects per second. The eject blast can be applied for instance for 10 milleseconds. The suction (vacuum) can be at about 7000 Pa (two inches of mecury). The compressed air applied to the port 52 can be at about 80000 Pa (12 psi) whilst the compressed air applied to the eject port 53 can be about 35000 Pa (5 psi).

Figure 8:
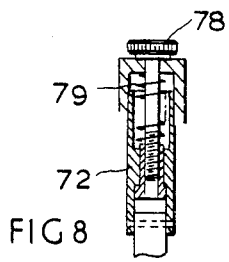
FIG. 8 is a section along the line VIII—VIII in FIG. 2.
Figure 9:
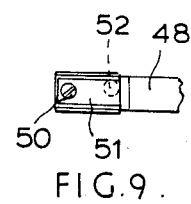
FIG. 9 is a view looking directly on the bottom of the wiper spring, in the direction of the arrow IX in FIG. 2.

As more than one object can occasionally be picked up by a single nozzle 47, means are provided against which an object on the nozzle 47 will wipe, after pick-up, for wiping off any excess objects(s). These means are in the form of a leaf spring blade 71 (see FIG. 2) carried on the feeder part 3 and positioned so that any object on the nozzle 47 will engage the underside of the end of the blade 71; although all objects will contact the blade 71, in general, one object will remain on the nozzle 47 while the others will fall off. Just under the nozzle wheel 4, the decking 14 can slope up at 45° so as to return objects to the bowl 2. The blade 71 is carried on a small block 72 by means of a screw 73 and clip spring 74 and is located by a small dowel 75. The block 72 can be adjusted and set about one axis by means of a setting screw 76 and spring 77, its height can be adjusted and set by means of a setting screw 78 and a spring 79 (see FIG. 8).

Although the nozzle wheel axis crosses but does not intersect the bowl axis in the apparatus described above, it is possible to have such axes intersecting, particularly because the highly resilient insert 12 is present.

The bowl 2 is arranged to rotate at such a speed that at the operating radii, the nozzles 47 are moving just slightly slower or just slightly faster than the insert 12, ensuring that all the objects can be removed from the bowl 2, a suitable differential speed being about 10%. For sorting objects the largest of which have a sieve (pass) size of about 2.5 mm, the bowl 2 may have an operating diameter (diameter of the trough base) of about 115 mm, the other dimensions being in proportion.

GB2169885A describes a slightly different bowl which could be used as an alternative; it also describes an alternative feeder head.

FIG. 13

Figure 13:
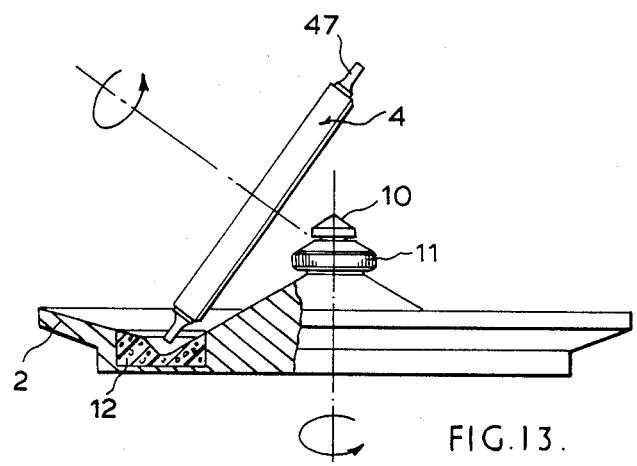
FIG. 13 is a view corresponding to FIG. 2, but showing part of a different embodiment.

In FIG. 2, it can be seen that the lowest and highest points of the motion of the nozzles 47 are on the same side of the bowl axis, the highest point being radially outwards (with respect to the bowl axis) of the lowest point. However, as shown in FIG. 13, the nozzle wheel 4 can effectively be positioned on the other side of the bowl axis so that, with respect to the bowl axis, the highest point of the path of the nozzles 47 is in a direction radially inwards of the lowest part, and in the case shown, on the other side of the bowl axis though this need not be necessarily so. It is considered that this provides the possibility of higher bowl speeds, say up to 100 rpm for the same radii as opposed to 20 rpm for the FIG. 2 arrangement.

In FIG. 13, the axis of the nozzle wheel 4 is inclined at 35° to the horizontal while the inner cone of the bowl is at 30° to the horizontal and the outer cone is at 15° to the horizontal.

We claim:

1. Apparatus for feeding discrete objects one by one, comprising:
   a container for containing a number of the objects, the container having a base formed of highly resilient material;
   a feeder member having at least one suction nozzle;
   means for applying suction to the nozzle;
   moving means for passing the nozzle down into the container and raising the nozzle up out of the container, whereby the nozzle picks up an object from the base of the container by suction and lifts the object from the container; and
   means for discharging the object from the nozzle when the object has been lifted from the container.

2. The apparatus of claim 1 wherein the container is an open-top container rotatable about a generally vertical axis with means for rotating the container about its axis, and the feeder member is also rotatable, with means for rotating the feeder member.

3. The apparatus of claim 2 wherein the container comprises two conical surfaces, namely an inner surface which slopes downwards and radially outwards, and an outer surface which slopes upwards and radially outwards.

4. The apparatus of claim 2 wherein said feeder member is rotatable about an axis which intersects the plane of the base of the container on the same side of the container axis as, and radially outwardly of, the lowest point of the path of the nozzle.

5. The apparatus of claim 2 wherein the feeder member is rotatable about an axis which intersects the plane of the container in relation to the container axis radially inwardly of the lowest point of the nozzle path.

6. The apparatus of claim 5 wherein said feeder member axis intersects the plane of the base of the container on the other side of said container axis to the lowest point of said nozzle path.

7. The apparatus of claim 1 wherein a leaf spring blade is provided for wiping against an object on the nozzle, or against which an object on the nozzle will wipe, after pick-up, for wiping off any excess object if the nozzle picks up more than one object.

8. The apparatus of claim 1 wherein the nozzle picks up the object from the base of the container at a pick-up point, and in which the difference in linear speed between that of the nozzle and that of the base of the container is not greater than about 10%.

9. Apparatus for feeding discrete objects one by one, comprising:
a feeder member carrying at least one suction nozzle;
a suction connection leading to a suction opening in the nozzle;
moving means for lowering the nozzle to pick up an object due to the effect of suction, and subsequently raising the nozzle towards a discharge point;
annular discharge opening means around said suction opening; and
valve means for connecting the annular discharge opening means to a compressed fluid supply when the nozzle reaches the discharge point, thereby blowing the object off the suction opening.

10. The apparatus of claim 9 wherein there is an array of at least three discharge openings forming the annular discharge opening means.

11. The apparatus of claim 9 and further comprising means for breaking the nozzle suction at the discharge point and discharging the object from the nozzle, which suction breaking means comprise means for blowing a pressure fluid into said suction connection without physically closing said suction connection.

12. The apparatus of claim 9 and further comprising a passage for connection to a pressure fluid supply and connected to said suction connection, and valve means for opening the pressure fluid connection when the nozzle reaches the discharge point, thereby causing the suction to be ineffective at the nozzle when the nozzle reaches the discharge point without physically closing said suction connection to the nozzle.

13. Apparatus for feeding discrete objects one by one, comprising:
a rotary feeder member carrying at least one suction nozzle, the nozzle defining a suction duct leading to a suction opening;
means for rotating the feeder member about an axis;
a suction connection for applying suction;
duct means permanently communicating the suction connection with the nozzle suction duct and hence to the nozzle suction opening;
a pressure fluid connection;
rotary face valve means comprising a first valve member rotating with the feeder member and defining a first valve port permanently communicating with the nozzle suction duct, and a second, non-rotary valve member defining a second port permanently communicating with the pressure fluid connection, said valve ports intercommunicating when the nozzle reaches a discharge point, thereby breaking the nozzle suction at the discharge point and discharging the objects from the nozzle by blowing the pressure fluid into the nozzle suction duct without physically closing the suction connection to the nozzle; and
moving means for lowering the nozzle to pick up an object due to the effect of suction and subsequently raising the nozzle with the object thereon.

14. Apparatus for feeding discrete objects one by one, comprising:
a rotary feeder member comprising a rotary disc one face of which defines a first valve port, the rotary disc also defining a bore and a feeder member suction duct permanently communicating with the bore;
a suction nozzle fitted in said bore, the nozzle defining a central suction duct permanently communicating with the first valve port;
sealing means sealing the suction nozzle to walls of said bore on each side of said transverse duct;
means for rotating the feeder member about an axis;
a suction connection for applying suction;
duct means permanently communicating the suction connection with the feeder head suction duct and hence to the nozzle suction opening;
a pressure fluid connection;
rotary face valve means comprising the feeder member disc which forms a first valve member, and a second, non-rotary valve member defining a second valve port permanently communicating with the pressure fluid connection, said first and second valve ports intercommunicating when the nozzle reaches a discharge point, thereby breaking the nozzle suction at the discharge point and discharging the objects from the nozzle by blowing the pressure fluid into the nozzle suction duct without physically closing the suction connection to the nozzle; and
moving means for lowering the nozzle to pick up an object due to the effect of suction and subsequently raising the nozzle with the object thereon.

15. The apparatus of claim 14 wherein there is defined discharge opening means adjacent said suction opening of the nozzle, the feeder member having a third valve port permanently communicating with the discharge opening means and the second valve member having a fourth valve port permanently communication with the pressure fluid connection, said third and fourth valve ports intercommunicating when the nozzle reaches the discharge point, thereby blowing the object off the suction opening.

16. Apparatus for feeding discrete objects one by one, comprising:
a feeder member carrying at least one suction nozzle and containing a base for receiving the nozzle;
a suction connection leading to a suction opening in the nozzle, the nozzle having there around an annulus of radial teeth which form an annular discharge opening means around said suction opening;
moving means for lowering the nozzle to pick up an object due to the effect of suction, and subsequently raising the nozzle towards a discharge point;
valve means for connecting the annular discharge opening means to a compressed fluid supply when the nozzle reaches the discharge point, thereby blowing the object off the suction opening; and
a duct leading from said valve means to a bore in which said suction nozzle is disposed.

17. Apparatus for feeding discrete objects one by one, comprising:

an open-top container for containing a number of the objects, the container having a base formed of highly resilient material and being rotatable about a generally vertical axis with means for rotating the container about its axis;

a feeder member having at least one suction nozzle and being rotatable about an axis inclined with respect to said generally vertical axis of the container but which does not intersect said container axis;

means for applying suction to the nozzle;

moving means for passing the nozzle down into the container and raising the nozzle up out of the container, whereby the nozzle picks up an object from the base of the container by suction and lifts the object from the container, the nozzle moving means causing the nozzle to follow a path whose closest point to the base of the container is upstream of a diametrical plane of the container to which said feeder member axis is parallel;

means for discharging the object from the nozzle when the object has been lifted from the container.

18. The apparatus of claim 17 wherein said feeder member is rotatable about an axis which intersects the plane of the base of the container on the same side of the container axis as, and radially outwardly of, the lowest point of said nozzle path.

19. The apparatus of claim 17 wherein the feeder member is rotatable about an axis which intersects the plane of the container in relation to the container axis radially inwardly of the lowest point of said nozzle path.

* * * * *

UNITED STATES PATENT AND TRADEMARK OFFICE
CERTIFICATE OF CORRECTION

PATENT NO.  : 4,951,838
DATED       : August 28, 1990
INVENTOR(S) : William J. TURNER It is certified that error appears in the above-identified patent and that said Letters Patent is hereby corrected as shown below:

Under the heading "[30]  Foreign Application Priority Data" please include the following:

-- Dec. 2, 1985  [GB]  United Kingdom ............... 8529628 --

Signed and Sealed this

Twenty-sixth Day of November, 1991

Attest:

HARRY F. MANBECK, JR.

*Attesting Officer*                    *Commissioner of Patents and Trademarks*